United States Patent
Hung et al.

(10) Patent No.: US 12,547,290 B2
(45) Date of Patent: *Feb. 10, 2026

(54) INFORMATION SHARING SYSTEM, METHOD, AND PROGRAM

(71) Applicant: Wacom Co., Ltd., Saitama (JP)

(72) Inventors: Ipei Hung, Saitama (JP); Tsukasa Nomi, Saitama (JP); Shoichi Sue, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,662

(22) Filed: Sep. 20, 2024

(65) Prior Publication Data

US 2025/0013342 A1 Jan. 9, 2025

Related U.S. Application Data

(63) Continuation of application No. 18/310,197, filed on May 1, 2023, now Pat. No. 12,124,670, which is a
(Continued)

(51) Int. Cl.
*G06F 3/0488* (2022.01)
*G06F 3/0481* (2022.01)
(Continued)

(52) U.S. Cl.
CPC ........ *G06F 3/0481* (2013.01); *G06F 3/04883* (2013.01); *H04L 67/12* (2013.01); *G06F 2203/04803* (2013.01)

(58) Field of Classification Search
CPC .............. G06F 3/0481; G06F 3/04883; G06F 2203/04803; G06F 3/165; G06F 40/166; G06F 3/1454; H04L 67/12; G09B 7/04
(Continued)

(56) References Cited

U.S. PATENT DOCUMENTS

| | | | |
|---|---|---|---|
| 9,672,752 B2 | 6/2017 | Obae et al. | |
| 2004/0254983 A1* | 12/2004 | Ando | G09B 7/04 709/204 |

(Continued)

FOREIGN PATENT DOCUMENTS

| | | |
|---|---|---|
| JP | 2006221127 A | 8/2006 |
| JP | 2013142718 A | 7/2013 |

(Continued)

OTHER PUBLICATIONS

International Search Report, dated Dec. 21, 2021, for International Patent Application No. PCT/JP2021/038895. (2 pages).

*Primary Examiner* — Abdul-Samad A Adediran
(74) *Attorney, Agent, or Firm* — Seed Intellectual Property Law Group LLP

(57) ABSTRACT

An information sharing system includes a plurality of terminal devices and an information sharing device communicable with the terminal devices. Each of the terminal devices includes a display unit which displays content in a display region, and a processor which performs display control over the display unit. The information sharing device includes a classification processing unit which classifies a plurality of users of the terminal devices into groups in reference to a result of evaluation of pieces of stroke data each indicating the content handwritten by a user of a corresponding one of the terminal devices. The information sharing device includes a display instruction section which instructs each of terminal devices corresponding to two or more constituent members belonging to one of the groups classified by the classification processing unit, among the terminal devices, to display a status information column indicating states of the two or more constituent members.

17 Claims, 16 Drawing Sheets

Related U.S. Application Data continuation of application No. PCT/JP2021/038895, filed on Oct. 21, 2021.

(51) Int. Cl.
*G06F 3/04883* (2022.01)
*H04L 67/12* (2022.01)

(58) Field of Classification Search
USPC .......................................... 709/204; 715/753
See application file for complete search history.

(56) References Cited

U.S. PATENT DOCUMENTS

| | | | |
|---|---|---|---|
| 2006/0160055 | A1 | 7/2006 | Osoegawa |
| 2012/0254773 | A1* | 10/2012 | Viswanathan ...... G06F 3/04883 715/753 |
| 2016/0321025 | A1* | 11/2016 | Ikeda .................... G06F 3/1454 |
| 2016/0321029 | A1* | 11/2016 | Zhang .................... G06F 3/165 |
| 2017/0090692 | A1* | 3/2017 | Kurita .................. G06F 40/166 |
| 2021/0191613 | A1 | 6/2021 | Weber |

FOREIGN PATENT DOCUMENTS

| | | | |
|---|---|---|---|
| JP | 2015095018 A | 5/2015 | |
| JP | 2018180194 A | 11/2018 | |
| JP | 2020144725 A | 9/2020 | |
| WO | WO 2020090356 A1 | 5/2020 | |

\* cited by examiner

FIG.5

Ink

```
{
    "documentMetadata":......,
    "inksemantics":,
    "devices":..............,
    "strokes":........................,
    "groups":,
    "contexts":..............,
}
```

70

```
<traceGroup xml:id="g0">
    <trace> 15 14, ----------------, 21 12 </trace>   : stroke #01
    <trace> 20 13, ----------------, 22 25 </trace>   : stroke #02
    <trace> 28 10, ----------------, 28 23 </trace>   : stroke #03
    <trace> 36 10, ----------------, 42 14 </trace>   : stroke #04
    <trace> 41 19, ----------------, 42 21 </trace>   : stroke #05
    <trace> 52 14, ----------------, 47 20 </trace>   : stroke #06
    <trace> 58  5, ----------------, 61  7 </trace>   : stroke #07
    <trace> 62 11, ----------------, 63 16 </trace>   : stroke #08
    <trace> 72  9, ----------------, 68 15 </trace>   : stroke #09
    <trace> 20 47, ----------------, 23 50 </trace>   : stroke #10
    ....
</traceGroup>
```

FIG.6

| CREATION PATTERN | FIRST STEP | | SECOND STEP | | THIRD STEP | |
|---|---|---|---|---|---|---|
| | CREATE AUXILIARY FIGURE | | SET UP EQUATION | | FIND SOLUTION | |
| | DESCRIBED/ NOT DESCRIBED | CORRECT/ INCORRECT | DESCRIBED/ NOT DESCRIBED | CORRECT/ INCORRECT | DESCRIBED/ NOT DESCRIBED | CORRECT/ INCORRECT |
| P1 | NOT DESCRIBED | — | DESCRIBED | INCORRECT | DESCRIBED | INCORRECT |
| P2 | DESCRIBED | CORRECT | DESCRIBED | INCORRECT | DESCRIBED | INCORRECT |
| P3 | DESCRIBED | CORRECT | DESCRIBED | CORRECT | DESCRIBED | CORRECT |
| P4 | NOT DESCRIBED | — | DESCRIBED | CORRECT | DESCRIBED | CORRECT |
| P5 | NOT DESCRIBED | — | NOT DESCRIBED | — | DESCRIBED | CORRECT |
| ... | ... | ... | ... | ... | ... | ... |

| USER ID | PERSONAL INFORMATION | | | | CLASSIFICATION INFORMATION | |
|---|---|---|---|---|---|---|
| | NAME | NICKNAME | AFFILIATION | ... | MATH | ... |
| U001 | VVVVVV | A | X CLASS | ... | M1 | ... |
| U002 | XXXXXX | B | X CLASS | ... | M2 | ... |
| U003 | YYYYYY | C | X CLASS | ... | M3 | ... |
| U004 | ZZZZZZ | D | X CLASS | ... | M1 | ... |
| ... | ... | ... | ... | ... | ... | ... |

| MATH, M1 GROUP | | | | |
|---|---|---|---|---|
| USER ID | NICKNAME | STATE | INK FILE NAME | ... |
| U001 | A | STUDYING | InkFile-1 | ... |
| U004 | D | STUDYING | InkFile-2 | ... |
| U007 | G | STUDYING | InkFile-3 | ... |
| U011 | K | STUDYING | InkFile-4 | ... |
| ... | ... | ... | ... | ... |

142(144)

| ORDER OF APPEARANCE | TAG INFORMATION | | GRAPH STRUCTURE DATA |
|---|---|---|---|
| | CONTENTS | TYPE | |
| 001 | X | ALPHABET | Tag-Graph-1 |
| 002 | POW | OPERATORS | |
| 003 | 2 | NUMBERS | |
| ... | ... | ... | ... |

ND METHOD, AND PROGRAM

INFORMATION SHARING SYSTEM, METHOD, AND PROGRAM

BACKGROUND

Technical Field

The present disclosure relates to an information sharing system, an information sharing method, and an information sharing program.

Description of the Related Art

Information sharing systems are known which are used to share various types of information among a plurality of users. For example, Japanese Patent Laid-Open No. 2020-144725 (hereinafter referred to as "Patent Document 1") discloses a web conferencing system in which a plurality of information processing devices and a server device are communicably connected to each other. More specifically, the server device performs control in such a manner as to display images of participants of a web conference on split screens, based on information regarding the order of the participants' participation in the web conference.

Application of this type of information sharing systems is not limited to web conferencing described above, and can include, for example, online group work. However, as the size of a group increases, the number of its constituent members increases, which tends to reduce shared interest. Consequently, there is a problem that the motivation of individual constituent members does not increase very much, even though group work is expected to have a synergistic effect through collaboration.

BRIEF SUMMARY

The present disclosure is directed to addressing the above-mentioned problem and provides an information sharing system, an information sharing method, and an information sharing program that can improve the motivation of constituent members in online group work.

An information sharing system according to a first aspect of the present disclosure includes a plurality of terminal devices, and an information sharing device which is communicable with each of the terminal devices. Each of the terminal devices includes a display unit which displays content in a display region, and a processor which performs display control over the display unit. The information sharing device includes a classification processing unit which classifies a plurality of users of the terminal devices into groups in reference to a result of evaluation of pieces of stroke data each indicating the content handwritten by a user of a corresponding one of the terminal devices. The information sharing device includes a display instruction section which instructs each of terminal devices corresponding to two or more constituent members belonging to one of the groups classified by the classification processing unit among the terminal devices to display a status information column indicating states of the two or more constituent members.

An information sharing method according to a second aspect of the present disclosure is performed by an information sharing system including a plurality of terminal devices each including a display unit which displays content, and an information sharing device which is communicable with each of the terminal devices. The method includes classifying, by the information sharing device, a plurality of users of the terminal devices into groups in reference to a result of evaluation of pieces of stroke data each indicating the content handwritten by a user of a corresponding one of the terminal devices. The method includes instructing, by the information sharing device, each of terminal devices corresponding to two or more constituent members belonging to one of the classified groups among the terminal devices to display a status information column indicating states of the two or more constituent members.

An information sharing program according to a third aspect of the present disclosure stores an information sharing program applicable to an information sharing system including a plurality of terminal devices each including a display unit which displays content, and an information sharing device which is communicable with each of the terminal devices. The information sharing program causes the information sharing device to execute a process including classifying a plurality of users of the terminal devices into groups in reference to a result of evaluation of pieces of stroke data each indicating the content handwritten by a user of a corresponding one of the terminal devices, and instructing each of terminal devices corresponding to two or more constituent members belonging to one of the classified groups among the terminal devices to display a status information column indicating states of the two or more constituent members.

According to the present disclosure, the motivation (interest level) of constituent members in online group work can be improved.

BRIEF DESCRIPTION OF THE SEVERAL VIEWS OF THE DRAWINGS

FIG. 5 is a diagram illustrating an example of a data structure of digital ink illustrated in FIG. 1;

FIG. 6 is a diagram illustrating an example of a result of classifying creation patterns of answers;

FIG. 7 is a diagram illustrating an example of a data structure of user information illustrated in FIG. 2;

FIG. 8 is a diagram illustrating an example of a data structure of group information illustrated in FIG. 2;

DETAILED DESCRIPTION

An embodiment of the present disclosure is described below with reference to the accompanying drawings. For ease of understanding, identical constituent components are denoted with the same signs as much as possible in each drawing, and redundant description is omitted.

Configuration of Information Sharing System 10

Overall Configuration

Figure 1:
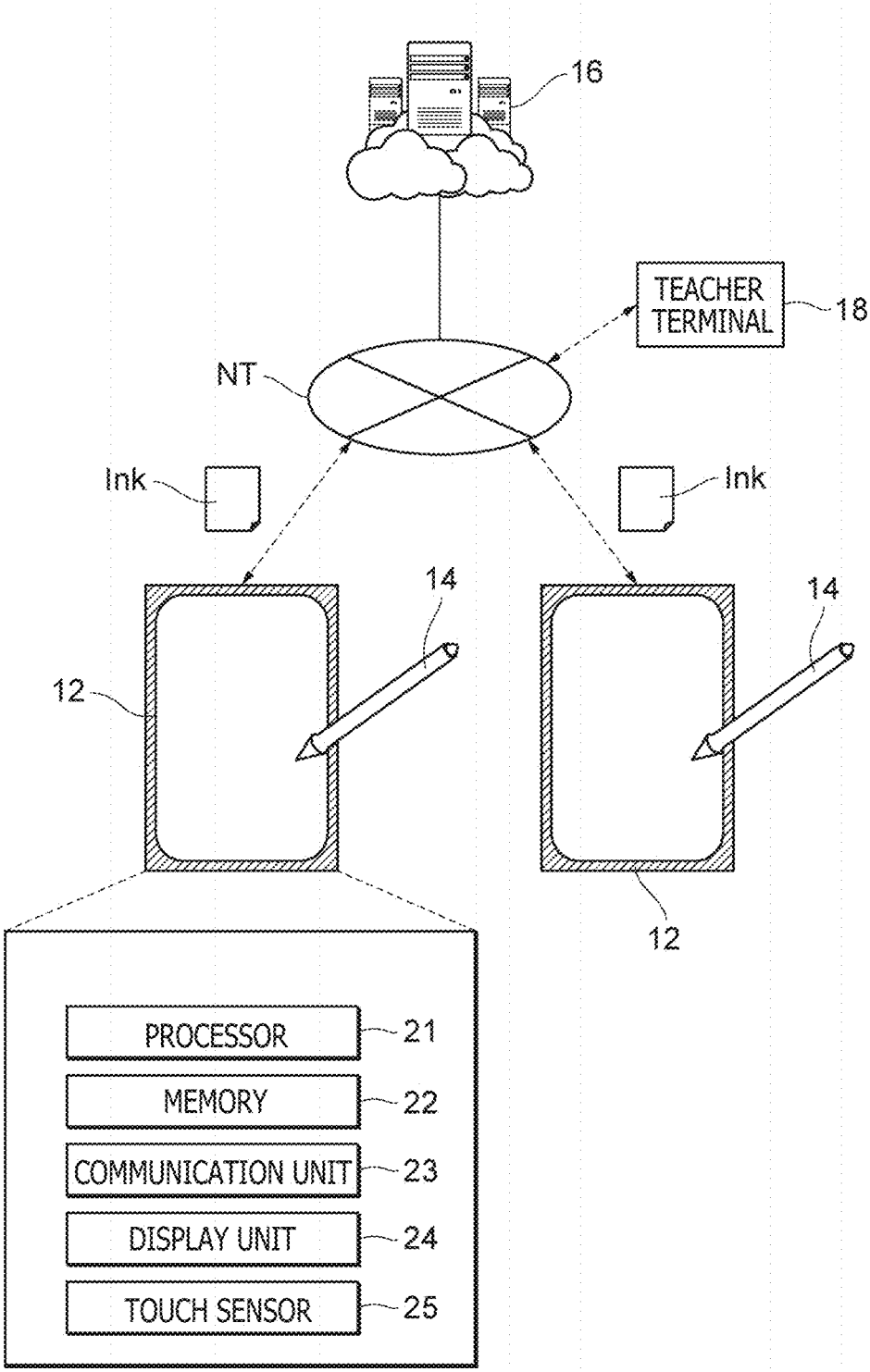
FIG. 1 is a diagram illustrating an overall configuration of an information sharing system according to an embodiment of the present disclosure.

FIG. 1 is a diagram illustrating an overall configuration of an information sharing system 10 according to an embodiment of the present disclosure. The purpose of the information sharing system 10 is to provide a "learning support service" to support online learning through information sharing among a plurality of users. These users are, for example, those who are educated in schools, specifically, pupils and students.

Specifically, the information sharing system 10 includes one or more student terminals 12 (corresponding to "terminal devices"), one or more electronic pens 14, a server device 16 (corresponding to an "information sharing device"), and a teacher terminal 18.

The student terminal 12 is configured to generate ink data (i.e., digital ink Ink) which expresses handwritten content, and to supply the digital ink Ink to the server device 16 via a network NT. The data format of the digital ink Ink, as what is generally called "ink description language," includes, for example, Wacom ink layer language (WILL), ink markup language (InkML), and ink serialized format (ISF).

The student terminal 12 is a computer owned by a user (in this example, a student) using the learning support service and has a function of detecting the position indicated by the electronic pen 14. The student terminal 12 includes, for example, a tablet, a smartphone, or a personal computer. Specifically, the student terminal 12 includes a processor 21, a memory 22, a communication unit 23, a display unit 24, and a touch sensor 25.

The processor 21 includes an arithmetic processing device including a central processing unit (CPU), a graphics processing unit (GPU), and a micro-processing unit (MPU). The processor 21 reads programs and data stored in the memory 22, thereby performing a generation process of generating the digital ink Ink, a rendering process of displaying the drawn content (i.e., handwritten content) indicated by the digital ink Ink, or a display control process of executing a "mutual (shared) display function" described later, for example.

The memory 22 stores programs and data necessary for the processor 21 to control each constituent component. The memory 22 includes a non-transitory computer-readable storage medium. Here, the computer-readable storage medium includes [1] storages such as a hard disk drive (HDD) and a solid state drive (SSD) that are built into a computer system, and [2] portable media such as an optical magnetic disk, a read-only memory (ROM), a compact disc-ROM (CD-ROM), and a flash memory.

The communication unit 23 has a communication function of performing wired or wireless communication with external devices. This allows the student terminal 12 to exchange various kinds of data including the digital ink Ink with the server device 16, for example.

The display unit 24 can visibly display content including images or video and includes, for example, a liquid crystal panel, an organic electroluminescence (EL) panel, or electronic paper. The display unit 24 may be flexible to allow the user to perform various writing operations with a touch surface of the student terminal 12 which may be curved or bent.

The touch sensor 25 is a sensor of a capacitance type and includes a plurality of sensor electrodes arranged in a plane. The touch sensor 25 includes, for example, a plurality of X line electrodes for detecting the position in an X axis of a sensor coordinate system and a plurality of Y line electrodes for detecting the position in a Y axis of the sensor coordinate system. Instead of a sensor of the mutual capacitance type described above, the touch sensor 25 may be a sensor of a self-capacitance type in which block-shaped electrodes are arranged in a two-dimensional grid pattern.

The electronic pen 14 is a pen-type pointing device and can communicate with the student terminal 12 in one way or two way directions. The electronic pen 14 is, for example, a stylus of an active electrostatic (AES) system or an electromagnetic resonance (EMR) system. A student as a user can hold the electronic pen 14 and move it while pressing a pen tip against the touch surface of the student terminal 12 to draw pictures and write texts on the student terminal 12.

The server device 16 is a computer that performs overall control related to the learning support and may be either a cloud-based computer or an on-premise computer. Although the server device 16 is illustrated here as a stand-alone computer, the server device 16 may instead be a group of computers building a distributed system.

The teacher terminal 18 is a computer owned by a user (in this example, a teacher) using the learning support service and includes, for example, a personal computer, a tablet, or a smartphone. The teacher terminal 18 can mutually communicate with the server device 16 via the network NT.

Block Diagram of Server Device 16

Figure 2:
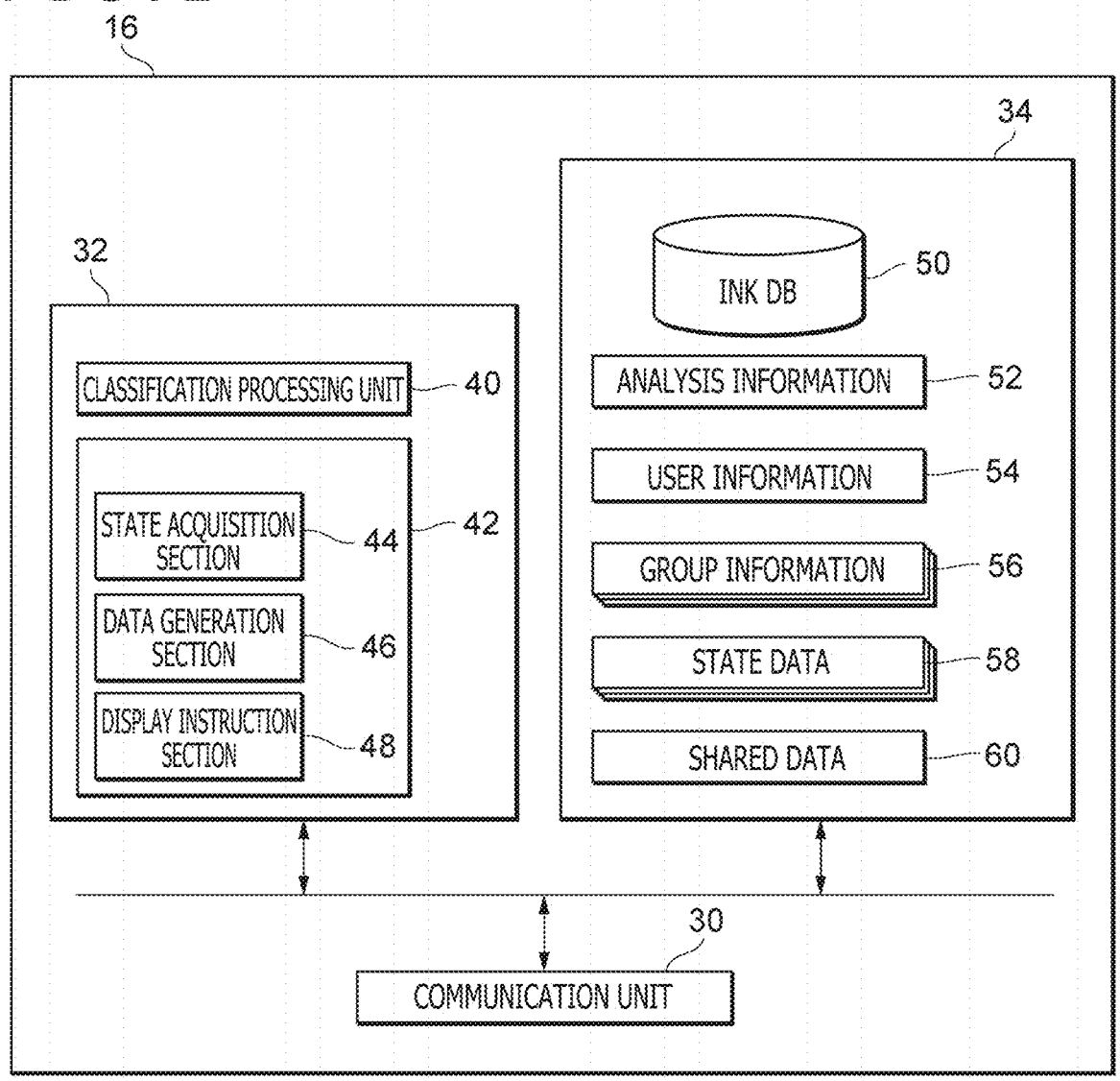
FIG. 2 is a block diagram illustrating an example of a configuration of a server device illustrated in FIG. 1.

FIG. 2 is a block diagram illustrating an example of a configuration of the server device 16 illustrated in FIG. 1. Specifically, the server device 16 includes a communication unit 30, a controller 32, and a storage 34.

The communication unit 30 is an interface that transmits and receives electrical signals to and from external devices. This allows the server device 16 to acquire pieces of state data 58 generated by the student terminals 12 and to provide shared data 60 generated by the server device 16 to the student terminals 12.

The controller 32 includes a processor such as a CPU and a GPU. The controller 32 functions as a classification processing unit 40 and a sharing processing unit 42 by reading and executing programs and data stored in the storage 34.

The classification processing unit 40 classifies a plurality of users of the student terminals 12 into groups in reference to a result of evaluation of pieces of stroke data each indicating handwritten content created by a corresponding one of the users of the student terminals 12. A specific configuration and an operation of the classification processing unit 40 are described in detail later with reference to FIGS. 13 to 18.

The sharing processing unit 42 performs an information process (hereinafter referred to as a "sharing process") for sharing various types of information for supporting learning among a plurality of users. Specifically, the sharing processing unit 42 includes a state acquisition section 44, a data generation section 46, and a display instruction section 48.

The state acquisition section 44 acquires the states of two or more constituent members belonging to a group classified by the sharing processing unit 42. Specifically, the state acquisition section 44 acquires the states of the constituent members in various learning scenes by analyzing pieces of the state data 58 transmitted regularly or irregularly from the student terminals 12. For example, the "state" during self-study includes presence/absence, studying, taking a break, what subject is being studied, and the amount of study time (e.g., start time, end time, and elapsed time). Further, the "state" while the student is working on an exercise problem includes presence/absence, the problem number being worked on, the progress against all the problems, and the progress against an individual problem (e.g., not started, being worked on, or completed).

The data generation section 46 generates the shared data 60 including the states of the constituent members acquired by the state acquisition section 44. The data generation section 46 may generate the shared data 60 common to a plurality of transmission destinations or may generate the shared data 60 customized for each transmission destination. The data generation section 46 may evaluate a relationship among the constituent members of the group and generate the shared data 60 including information (hereinafter referred to as "relationship information") that indicates a group of constituent members having a relatively high level of the relationship with each other. For example, evaluation criteria for the relationship may include objective criteria such as a level of understanding, scores, and pairing history, as well as subjective criteria such as a sense of rivalry, admiration, liking, and personality.

The display instruction section 48 instructs display of a status information column 84 (FIG. 9) or 93 (FIG. 11), which indicates the states of two or more constituent members belonging to a corresponding one of the groups classified by the classification processing unit 40. Specifically, the display instruction section 48 transmits the shared data 60 described above at once to instruct each of the student terminals 12 corresponding to the constituent members to display the status information column 84 (93).

The storage 34 stores programs and data necessary for the controller 32 to control each constituent component. The storage 34 includes a non-transitory computer-readable storage medium. In the example of FIG. 2, a database (hereafter an "ink DB 50") related to the digital ink Ink (FIG. 1) is built in the storage 34. Further, analysis information 52, user information 54, a plurality of pieces of group information 56, a plurality of pieces of the state data 58, and the shared data 60 are stored in the storage 34.

The analysis information 52 includes data related to the analysis of the digital ink Ink. For example, the analysis information 52 includes parameters for evaluating content 62 and a result of evaluation of the content 62. A specific configuration of the analysis information 52 is described in detail later with reference to FIG. 13 and FIGS. 16 to 18.

The user information 54 includes various kinds of information regarding each user, such as [1] user identification information, [2] user's personal information, or [3] classification information of a learning group. Examples of the "user identification information" include a service account, identification information (i.e., device identification (ID)) of each student terminal 12, and identification information (i.e., pen ID) of each electronic pen 14. Examples of the "user's personal information" include real name information including the name, anonymous information including the nickname, affiliation including the school name, grade, and class, gender, and scores. Examples of the "classification information" include a group ID, a type of a subject, and a level of proficiency.

Each group information 56 includes various kinds of information regarding a group, such as [1] group identification information, [2] constituent member information regarding each constituent member, or [3] state information indicating various states. Examples of the "group identification information" include the classification information described above. Examples of the "constituent member information" include the identification information and personal information of each constituent member. The "state information" may include not only the state of each constituent member but also the state of each student terminal 12 and the state of each electronic pen 14.

Each state data 58 includes various types of information with which the state of the corresponding constituent member, student terminal 12, or electronic pen 14 can be identified, such as [1] input information entered by the user himself/herself, and [2] detection information indicating the detection results of various states. Examples of the "input information" include user-controlled operation information and content being displayed. Examples of the "detection information" include the on/off state of the device, log-in or log-off, and an image captured by a web camera.

The shared data 60 includes information (hereinafter "shared information") shared among constituent members of a group. The shared information includes, for example, group identification information, pieces of constituent member information, pieces of state information, and the relationship information. The shared data 60 may include pieces of personal information (e.g., names and student IDs) with which individuals can be identified or include only pieces of anonymous information (e.g., nicknames and online names) with which individuals cannot be identified.

Operation of Information Sharing System 10

The information sharing system 10 according to the present embodiment is configured as described above. Next, an operation of the information sharing system 10 is described with reference to the sequence in FIG. 3 and FIGS. 4 to 8. The example described here is the case where information is shared within a group to which a constituent member A belongs.

Figure 3:
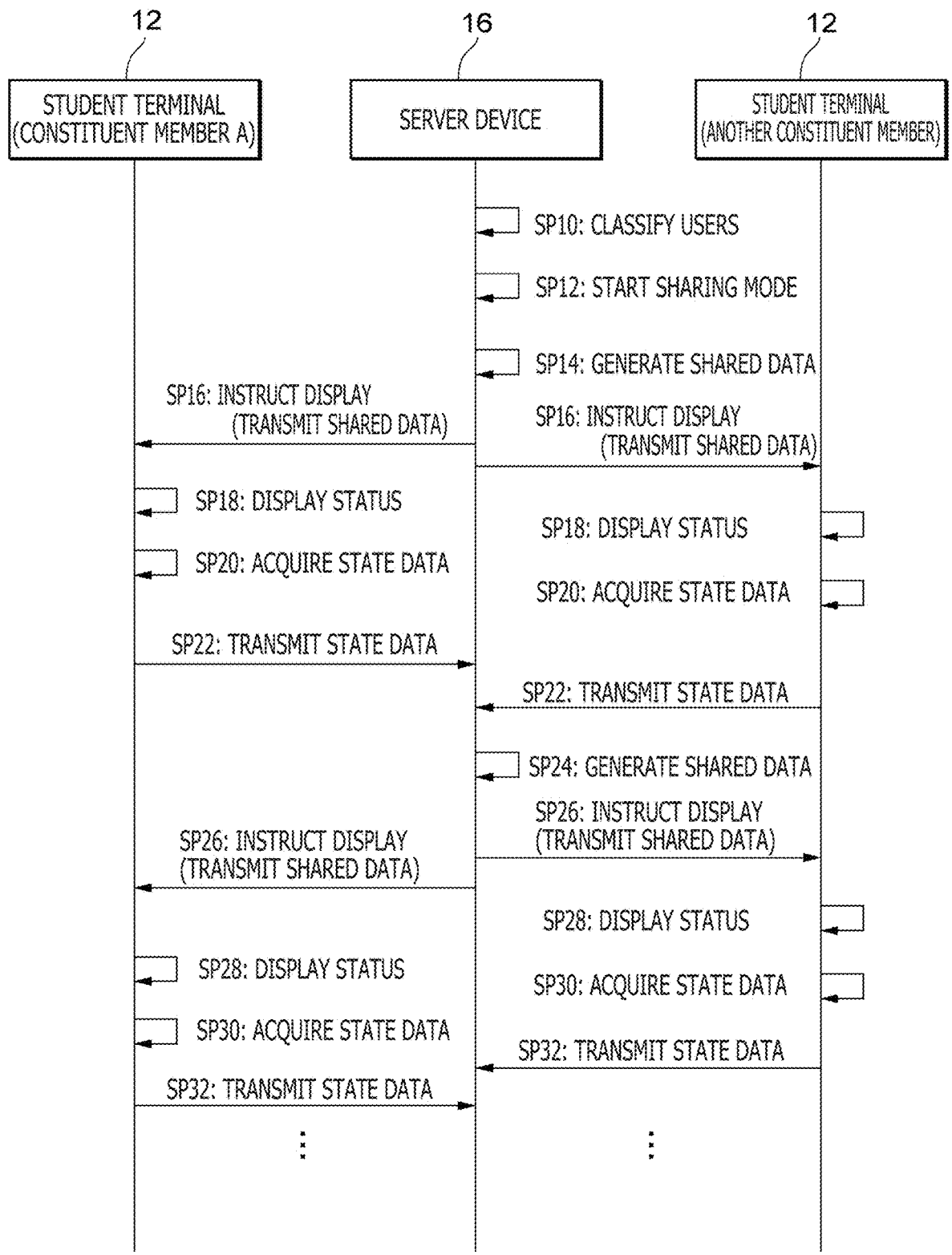
FIG. 3 is a sequence diagram illustrating an example of an operation of the information sharing system.

In step SP10 of FIG. 3, the classification processing unit 40 of the server device 16 performs an evaluation process on pieces of stroke data 70 (FIG. 5) and classifies a plurality of users into groups in reference to the evaluation result obtained.

Figure 4:
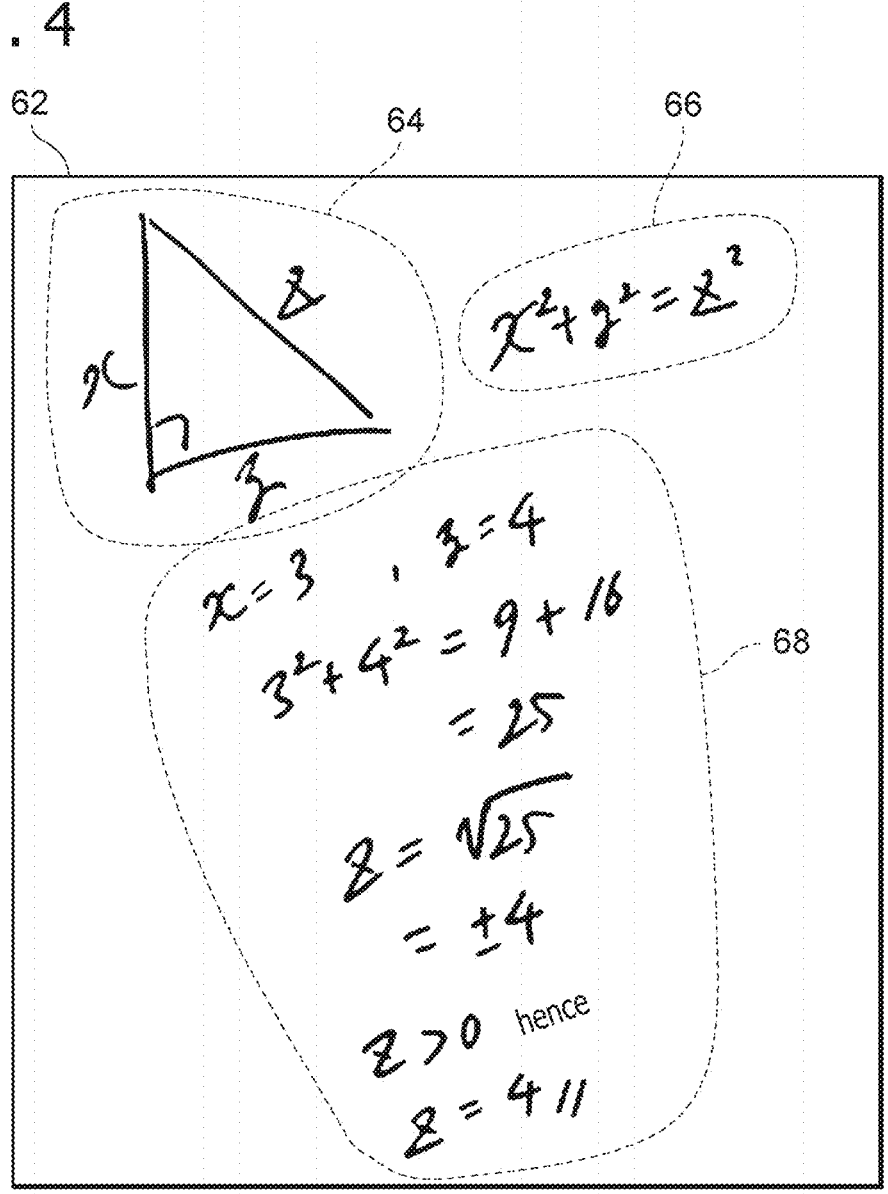
FIG. 4 is a view illustrating an example of content created using a student terminal illustrated in FIG. 1.

FIG. 4 is a view illustrating an example of the content 62 created using the student terminal 12 illustrated in FIG. 1. The handwritten content 62 indicates an answer to a math problem to find the length of the hypotenuse of a right triangle. The content 62 includes a content element 64 indicating a figure, a content element 66 indicating a formula for the Pythagorean theorem, and a content element 68 indicating a calculation process.

FIG. 5 is a diagram illustrating an example of the data structure of the digital ink Ink illustrated in FIG. 1. The digital ink Ink has a data structure in which [1] document metadata (document metadata), [2] semantic data (ink semantics), [3] device data (devices), [4] stroke data (strokes), [5] classification data (groups), and [6] context data (contexts) are sequentially arrayed.

The stroke data 70 is data which describes individual strokes that constitute the content 62. As understood from FIG. 5, each stroke is described by a plurality of pieces of point data that are sequentially arrayed within a <trace> tag. Each point data includes at least an indicated position (X coordinate and Y coordinate) and is separated by a delimiter such as a comma. For convenience of illustration, in FIG. 5, only pieces of point data indicating the start and end points of a stroke are depicted, and pieces of the point data indicating multiple via points are omitted. Each point data may include, for example, the sequence of the writing and the pen pressure and posture (orientation) of the electronic pen 14, in addition to the indicated position described above.

FIG. 6 is a diagram illustrating an example of a result of classifying creation patterns of answers. Here, five levels of creation patterns, P1, P2, P3, P4, and P5, are prepared. The pattern "P1" corresponds to a creation pattern created by a student with the lowest level of understanding. The pattern "P5" corresponds to a creation pattern created by a student with the highest level of understanding.

For example, if a math problem to find the length of the hypotenuse of a right triangle is on the test, the answer creation pattern is divided into three solution steps from the first to the third step. The first step corresponds to a process of creating an auxiliary figure. The second step corresponds to a process of setting up an equation according to a formula. The third step corresponds to a process of finding a solution from the equation.

Each step has a "described/not described" item and a "correct/incorrect of content" item. That is, the performance level at each step is divided into three levels: [1] no description, [2] there is a description but the content thereof is incorrect, and [3] there is a description and the content thereof is correct. As for "no description," there may be two scenarios. First, it may be that the student cannot write because the student does not remember the content. Second, it may be that the student fully understands the content and thus does not bother to write it down. Which of the two reasons is behind "no description" is determined according to the performance level of the next step.

In step SP12 of FIG. 3, the sharing processing unit 42 of the server device 16 starts a control mode (i.e., sharing mode) of sharing information within a single group. With the start of this sharing mode, the sharing processing unit 42 identifies the group and constituent members to which the sharing mode is applied, by acquiring and referring to the user information 54.

FIG. 7 is a diagram illustrating an example of the data structure of the user information 54 illustrated in FIG. 2. The user information 54 is data in a table format that indicates the correspondence between [1] the "user ID," which is the identification information of each user, [2] the "personal information" of each user, and [3] the "classification information" of each learning group. In the example illustrated in FIG. 7, the personal information includes the name, nickname, and affiliation (school name, grade, and class). In the example of FIG. 7, the classification information includes the group name of each subject (e.g., math groups M1 to M3).

In step SP14 of FIG. 3, the sharing processing unit 42 (more particularly, the data generation section 46) uses the group information 56 to generate the shared data 60 including information to be shared within a group.

FIG. 8 is a diagram illustrating an example of the data structure of the group information 56 illustrated in FIG. 2. The group information 56 is data in the table format and is provided for each group. In the example of FIG. 8, the group information 56 indicates the correspondence between the "user ID," which is the identification information of each constituent member, the "nickname" of each constituent member, the "state" of each constituent member, and the "ink file name" being created. In the initial state of the sharing mode, since the state acquisition section 44 has not acquired the state data 58, a default value is stored in each of the "state" and the "ink file name" of the shared data 60.

In step SP16 of FIG. 3, the sharing processing unit 42 instructs each of the student terminals 12 corresponding to two or more constituent members belonging to the group to display the status information column 84 (FIG. 9), which indicates the states of the two or more constituent members. Specifically, the server device 16 transmits the shared data 60 generated in step SP14 to the corresponding two or more student terminals 12 at a once. Accordingly, the shared data 60 is received by each of the student terminals 12 owned by the constituent members (the constituent member A and other constituent members) of the group.

In step SP18, each student terminal 12 displays the status information column 84 (see FIG. 9) together with content 82 by using the shared data 60 transmitted in step SP16. Specifically, the processor 21 generates a display signal including the status information column 84, by using the shared data 60, and supplies the display signal to the display unit 24 to perform desired display control.

In step SP20, the processor 21 of each student terminal 12 acquires the state data 58 indicating the state of the corresponding constituent member at the present time.

In step SP22, each student terminal 12 transmits the latest state data 58 acquired in step SP20 to the server device 16. Accordingly, the state acquisition section 44 of the server device 16 acquires the latest state of each constituent member through the reception of the state data 58. Through this acquisition, the group information 56 is updated to the latest state. Since the state acquisition section 44 has acquired the state data 58 here, the "state" and the "ink file name" in the shared data 60 are overwritten and updated from the default values to the latest values.

After that, the information sharing system 10 sequentially repeats generation of the shared data 60 (SP24), instruction of display (SP26), display of the status information column 84 (SP28), acquisition of the state data 58 (SP30), and transmission of the state data 58 (SP32). In this way, information is shared within the group.

Example of Mutual Display Function

Next, an example of the mutual display function by the student terminals 12 is described with reference to FIGS. 9 to 12. Here, the "mutual display function" means a function of mutually displaying the states of the students belonging to the same group. Through this function, since the students can be made aware of the learning states of students whose abilities and level of understanding are similar to their own, learning motivation is expected to improve.

Operation During Self-Study

The mutual display function in the case where self-study is performed in a class is described in detail with reference to FIGS. 9 and 10.

A. Operation of Processor 21

The processor 21 illustrated in FIG. 1 functions as a "display controller" that performs display control over the display unit 24. The processor 21 performs display control in such a manner as to display the status information column 84 indicating the states of two or more constituent members of the group to which the user of the corresponding student terminal 12 belongs. The "two or more constituent members" may be [1] all the constituent members, [2] all the other constituent members except this user, or [3] some of the other constituent members except this user. "Some of the other constituent members" may be determined according to a predetermined rule or randomly determined.

The processor 21 may perform the display control in such a manner that the status information column 84 is placed anywhere within a display region 80 included in the display unit 24. For example, the processor 21 may perform the display control in such a manner that the status information column 84 is placed at a periphery of the display region 80. The status information column 84 is, for example, a collection of individual information columns 86 to 88, each of which indicates the state of a corresponding one of individual constituent members. The individual information columns 86 to 88 may be provided as an integral and indivisible column or may be provided as independent columns. Each of the individual information columns 86 to 88 displays the constituent member information in association with the state information. From the viewpoint of protection of personal information, it is desirable that the constituent member information be content (e.g., nickname) with which an individual cannot be identified.

The processor 21 may perform the display control in such a manner that the display mode of each of the individual information columns 86 to 88 described above can be changed for each constituent member. In this case, the processor 21 may perform the display control in such a manner that one or two or more individual information columns 88 of the status information column 84 are highlighted more than the other individual information columns 86 and 87. Examples of the highlight method include [1] making the contrast of the display color relatively high, [2] making the line width relatively thicker, [3] making the size of the characters or frame relatively larger, [4] assigning a special mark, and [5] placing the column in a position more easily visible to the user.

The processor 21 may perform the display control in such a manner that one or more of the individual information columns 86 to 88 are highlighted in response to a predetermined operation performed by the user. Examples of this operation include clicking, touching, and dragging of a target portion. The processor 21 may also perform the display control in such a manner that the display mode of the manually highlighted individual information columns 86 to 88 is returned to the original state in response to a predetermined operation performed by the user.

The processor 21 may perform the display control in such a manner that one or more of the individual information columns 86 to 88 are highlighted in response to an instruction from the server device 16. This instruction is given in response to the reception of the shared data 60 including the relationship information. The processor 21 may also perform the display control in such a manner that the display mode of the automatically highlighted individual information columns 86 to 88 is changed in response to a predetermined operation performed by the user.

B. Example of Screen Display

Figure 9:
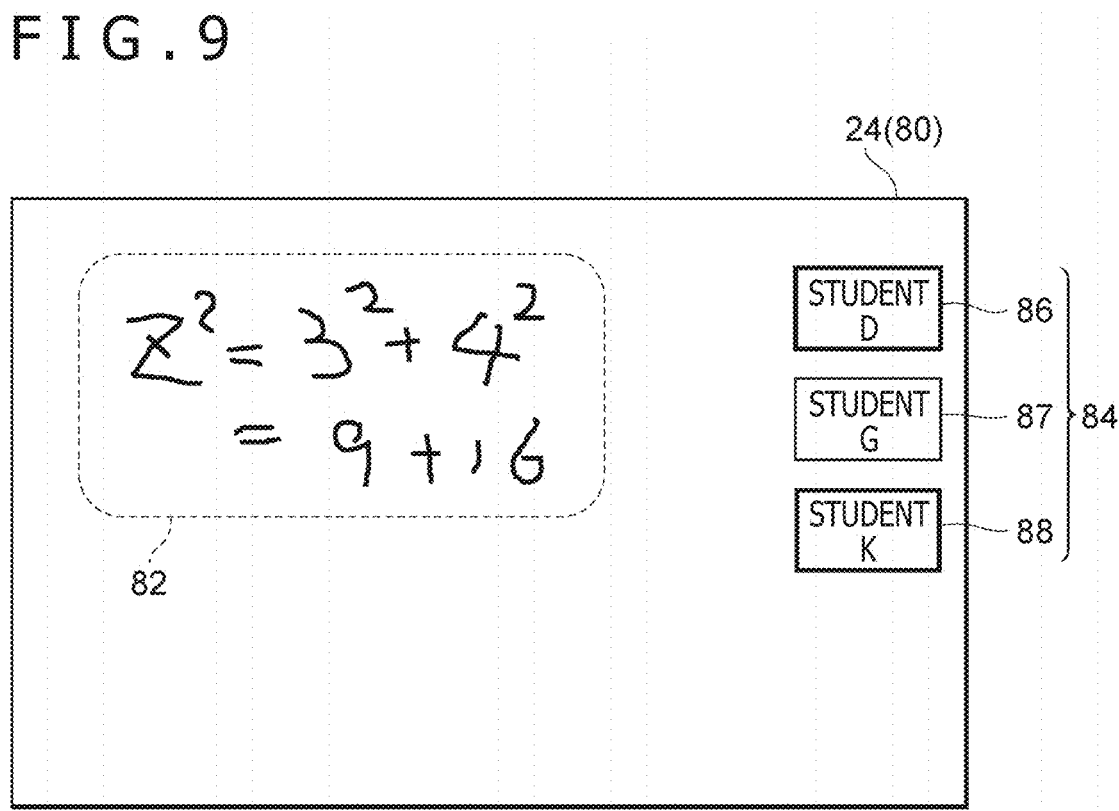
FIG. 9 is a view illustrating a first form of the screen display during self-study.

FIG. 9 is a view illustrating a first form of the screen display during self-study. Here, it is assumed that four students are classified into the same group and registered with the nicknames A, D, G, and K. Within the display region 80 of the display unit 24, the content 82 (in this example, a formula) handwritten by student A is displayed. The status information column 84 is provided at a right periphery of the display region 80. The status information column 84 includes the three individual information columns 86, 87, and 88, which are arranged side by side in a vertical direction. The individual information columns 86, 87, and 88 respectively indicate the state of student D, the state of student G, and the state of student K who belong to the same group as student A.

At the present time, student D and student K are both studying, while student G is taking a break. In this case, the individual information columns 86 and 88 are highlighted with a thicker border than the individual information column 87. For example, assume that student A is highly interested in student K (specifically, a sense of rivalry or admiration/liking). When student A performs a drag operation on the individual information column 88 corresponding to the student K, the display form of the student terminal 12 transitions from FIG. 9 to FIG. 10.

Figure 10:
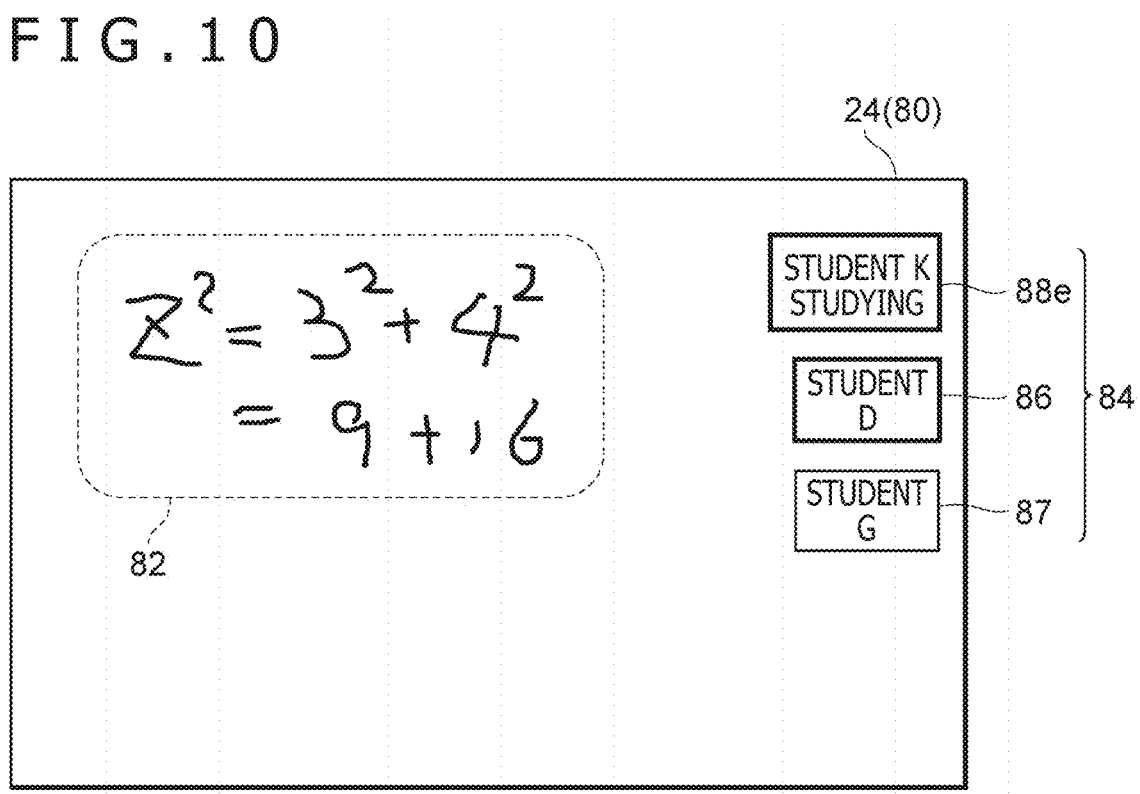
FIG. 10 is a view illustrating a second form of the screen display during self-study.

FIG. 10 is a view illustrating a second form of the screen display during self-study. The status information column 84 in the second form is different from the first form (FIG. 9) in that [1] an enlarged individual information column 88e is displayed and [2] the individual information column 88e is placed at the top. In this way, through the customization of the display, student A can more easily recognize the state of the student K in whom the student A has a high interest. This generates a "chemical reaction" in which student A's learning motivation increases.

Operation During Working on Exercise Problem

The mutual display function in the case where students work on the same exercise problem in a class is described in detail with reference to FIGS. 11 and 12.

A. Operation of Processor 21

The processor 21 illustrated in FIG. 1 performs the display control in such a manner as to display the status information column 93, which indicates the states of two or more constituent members of the group to which the user of this student terminal 12 belongs. This display control is basically the same as the "operation during self-study" case described above, except that the display mode of content 90 is different.

The processor 21 may switch between a "single-screen mode," in which a single screen is displayed, and a "split-screen mode," in which split screens are displayed, according to an operation performed by the user. During execution of the split-screen mode, the processor 21 splits the display region 80 into two or more sub-regions R1 to R4 (FIG. 12) and performs the display control in such a manner that each of pieces of the content 90 being displayed by the respective student terminals 12 corresponding to the constituent members is displayed in a corresponding one of the sub-regions R1 to R4 to present a split-screen view. The sizes, shapes, number of divisions, positions, or arrangement of the sub-regions may be changed or adjusted depending on each application.

B. Example of Screen Display

Figure 11:
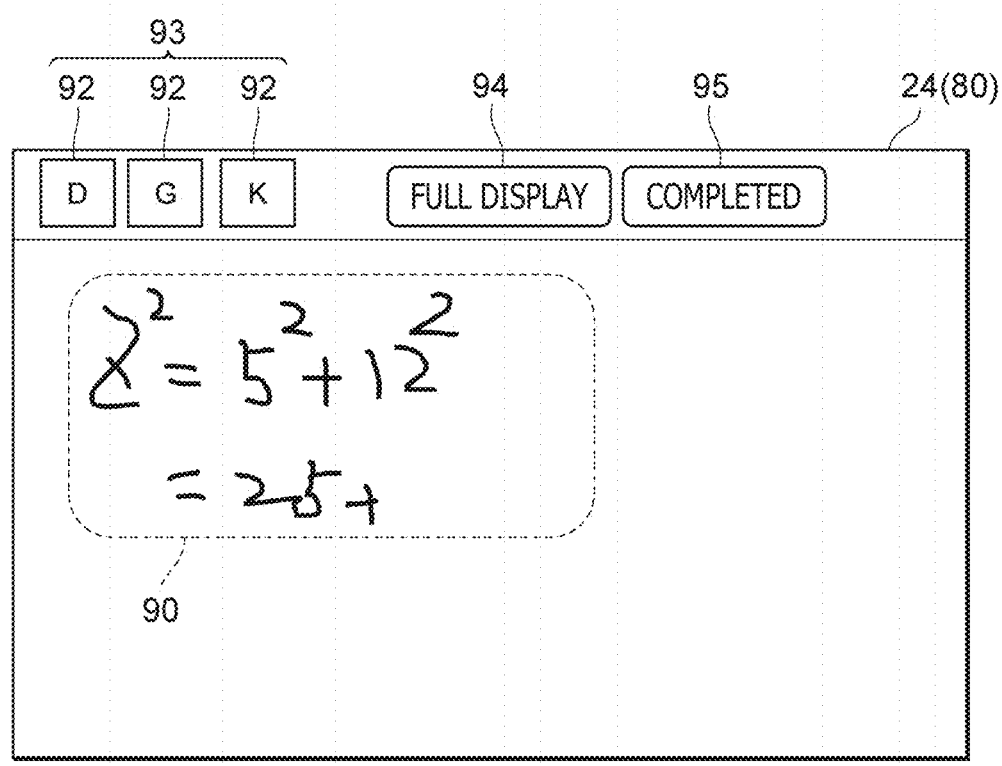
FIG. 11 is a view illustrating a first form of the screen display while students are working on an exercise problem.

FIG. 11 is a view illustrating a first form of the screen display while students are working on an exercise problem. Here, it is assumed that four students are classified into the same group and registered with nicknames A, D, G, and K. Within the display region 80 of the display unit 24, the content 90 (in this example, a formula) handwritten by student A is displayed. The status information column 93 including three individual information columns 92, a button 94 labeled "full display," and a button 95 labeled "completed" are provided at an upper periphery of the display region 80. Each of the three individual information columns 92 indicates a corresponding one of the state of student D, the state of student G, and the state of student K from the left side to the right side.

At the present time, student D and student G are both in the middle of working on an exercise problem, while student K has completed the exercise problem. In this case, the individual information column 92 for student K is highlighted with a thicker border than the other individual information columns 92. For example, student A touches the [full display] button 94 to check the progress of the other students. In response, the processor 21 switches the single-screen mode to the split-screen mode, and the display form of the student terminal 12 transitions from FIG. 11 to FIG. 12.

Figure 12:
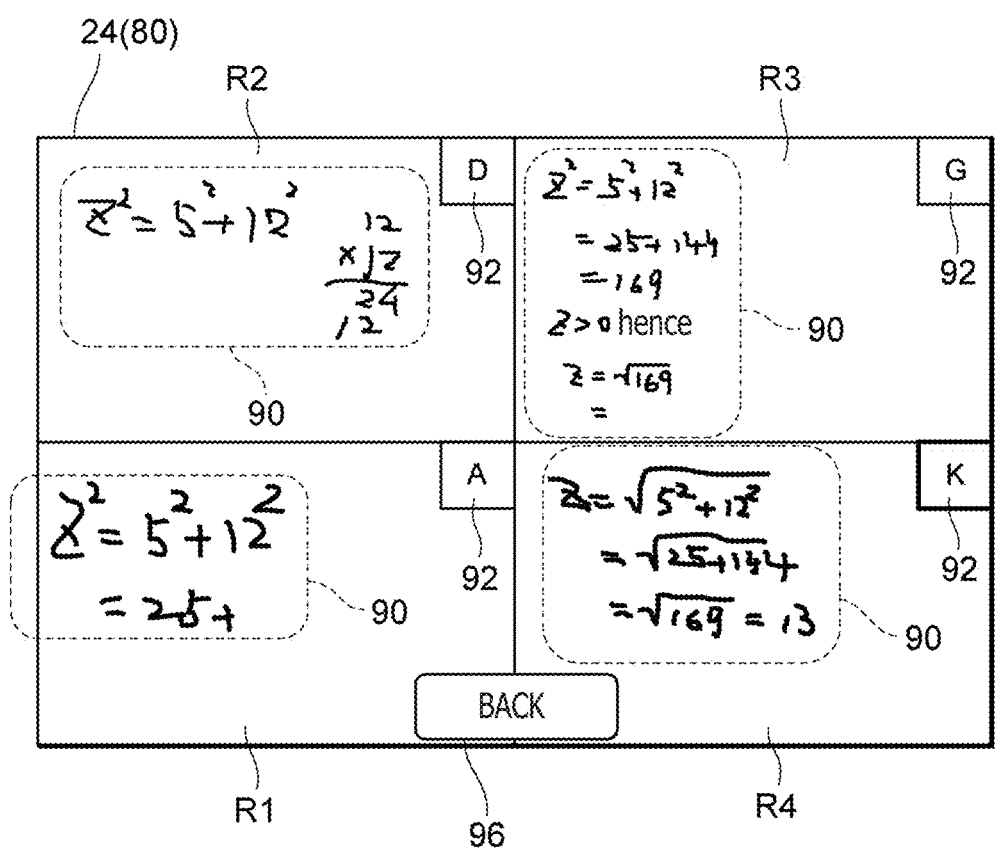
FIG. 12 is a view illustrating a second form of the screen display while the students are working on the exercise problem.

FIG. 12 is a view illustrating a second form of the screen display while students are working on the exercise problem. Within the display region 80 of the display unit 24, the sub-regions R1 to R4 are displayed in two rows and two columns to present a split-screen view. In the lower left sub-region R1, the content 90 displayed on the student terminal 12 of student A and the individual information column 92 corresponding to student A are displayed together. In the upper left sub-region R2, the content 90 displayed on the student terminal 12 of student D and the individual information column 92 corresponding to student D are displayed together. In the upper right sub-region R3, the content 90 displayed on the student terminal 12 of student G and the individual information column 92 corresponding to student G are displayed together. In the lower right sub-region R4, the content 90 displayed on the student terminal 12 of student K and the individual information column 92 corresponding to student K are displayed together. This allows the student A to recognize the progress of the other students at a glance.

When the student A touches a [Back] button 96, the processor 21 switches the split-screen mode to the single-screen mode, and the display mode of the student terminal 12 transitions from FIG. 12 to FIG. 11. When student A finishes the exercise problem and taps the [completed] button 95 (FIG. 11), the state of student A transitions from "working on exercise problem" to "completed."

Advantageous Effects of Information Sharing System 10

As described above, the information sharing system 10 according to the present embodiment includes a plurality of terminal devices (in the present embodiment, the student terminals 12) and an information sharing device (in the present embodiment, the server device 16) that can communicate with each of the student terminals 12. The student terminal 12 includes the display unit 24, which displays content in the display region 80, and the processor 21, which performs display control over the display unit 24.

The server device 16 includes the classification processing unit 40 and the display instruction section 48. The classification processing unit 40 classifies a plurality of users into groups in reference to the result of the evaluation of pieces of the stroke data 70 each indicating the content 62 handwritten by a user of a corresponding one of the student terminals 12. The display instruction section 48 instructs the student terminals 12 corresponding to two or more constituent members belonging to one of the groups classified by the classification processing unit 40 to display the status information column 84 (93), which indicates the states of the two or more constituent members.

According to an information sharing method and a program according to the present embodiment, a computer (in the present embodiment, the server device 16) performs a classification step (SP10 in FIG. 3) of classifying a plurality of users into groups in reference to the result of the evaluation of pieces of the stroke data 70 each indicating the content 62 handwritten by a user of a corresponding one of the student terminals 12 and an instruction step (SP16, SP26) of instructing each of the student terminals 12 corresponding to two or more constituent members belonging to one of the classified groups to display the status information column 84 (93), which indicates the states of the two or more constituent members.

In this way, a plurality of users are classified into groups in reference to the result of the evaluating the pieces of the stroke data 70, and each of the student terminals 12 corresponding to two or more constituent members belonging to one of the groups is instructed to display the status information column 84 (93), which indicates the states of the two or more constituent members. The display of the status information column 84 (93) makes the states of the constituent members in the group easier to see. Accordingly, it is possible to make each constituent member mutually aware of the current state of each of the constituent members, who are recognized based on their handwritten content as having some commonality. This serves to motivate the constituent members in online group work.

When the status information column 84 (93) is a collection of the individual information columns 86 to 88 (92), which indicate the states of individual constituent members, the processor 21 may perform the display control in such a manner that the display mode of each of the individual information columns 86 to 88 (92) can be changed for each constituent member. Accordingly, the visibility of the individual information columns 86 to 88 (92) can be customized for each constituent member.

The processor 21 may also perform the display control in such a manner that at least one individual information column 88*e* included in the status information column 84 is highlighted more than the other individual information columns 86 and 87. This makes it easier to recognize the state(s) of a particular constituent member(s) compared to the case where uniform display is performed for all of the individual information columns 86 to 88.

The processor 21 may also perform the display control in such a manner that at least one individual information column 88*e* is highlighted in response to an operation performed by the user. Alternatively, the processor 21 may perform the display control in such a manner that at least one individual information column 88*e* is highlighted in response to an instruction from the server device 16.

The display instruction section 48 may transmit the shared data 60 including the states of two or more constituent members at once to instruct each of the student terminals 12 corresponding to the constituent members to display the status information column 84 (93). By making the data to be transmitted to the student terminals 12 common, the time taken to transmit the data can be shortened.

When the shared data 60 includes pieces of the anonymous information of the constituent members, the processor 21 may also perform the display control in such a manner that the pieces of anonymous information are displayed in the status information column 84 (93) together with the states of the respective constituent members. Since this makes the user less aware that the user's state is being displayed on the other student terminals 12, the user is more likely to accept the display function of the status information column 84 (93).

The processor 21 may also perform the display control in such a manner as to display the status information column 84 (93) indicating the state of each of the two or more constituent members identified by the shared data 60, except for the state of the user of the student terminal 12. This makes the user less self-conscious about his/her state being displayed on the other student terminals 12, and hence, the user is more likely to accept the display function of the status information column 84 (93).

The processor 21 may also perform the display control in such a manner that the status information column 84 (93) is placed at a periphery of the display region 80. This reduces possible interference of the region between the status information column 84 (93) and the content 82 (90) when the content 82 (90) is displayed.

The processor 21 may split the display region 80 into two or more sub-regions R1 to R4 and perform the display control in such a manner that each of pieces of the content 90 being displayed by the individual student terminals 12 corresponding to the constituent members is displayed in a corresponding one of the sub-regions R1 to R4 to present a split-screen view.

When the constituent members are students, each of the states of the constituent members may include the amount of study time spent by a corresponding one of the students. Alternatively, when the constituent members are students, each of the states of the constituent members may include the progress of a corresponding one of the students with respect to an exercise problem. Through visualization of the amount of study time or progress, it is easier to increase awareness of other students.

User Classification Operation

A user classification operation performed by the server device 16 is next described in detail with reference to FIGS. 13 to 18. This classification operation is performed in step SP10 of FIG. 3.

Detailed Block Diagram

Figure 13:
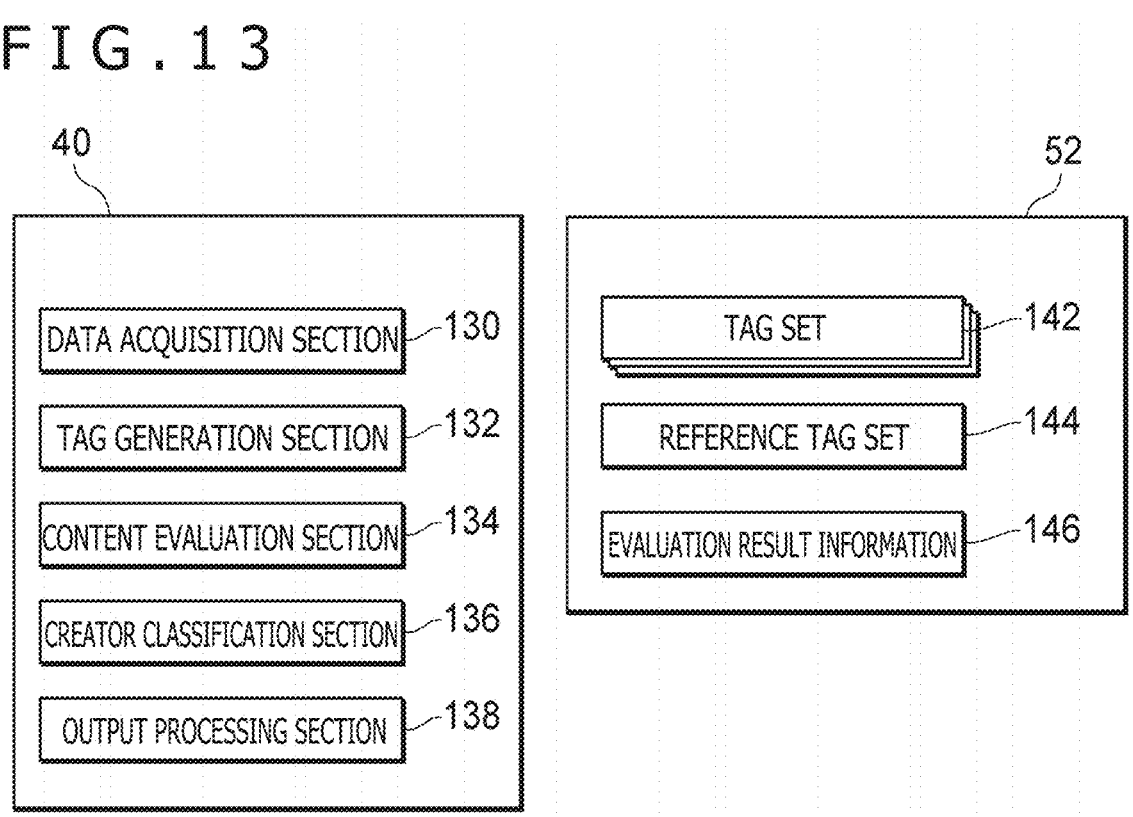
FIG. 13 is a detailed block diagram of a classification processing unit and analysis information illustrated in FIG. 2.

FIG. 13 is a detailed block diagram of the classification processing unit 40 and the analysis information 52 illustrated in FIG. 2. The classification processing unit 40 includes a data acquisition section 130, a tag generation section 132, a content evaluation section 134, a creator classification section 136, and an output processing section 138.

The data acquisition section 130 acquires the stroke data 70 (FIG. 5), which indicates the shapes of strokes constituting the handwritten content 62 (FIG. 4) and the drawing order of the strokes. For example, the stroke data 70 is included in the digital ink Ink, which is accumulated in the Ink DB 50. The content 62 is a collection of content elements such as a figure, text, and a formula and may be, for example, an answer to a math or arithmetic problem.

The tag generation section 132 generates a tag information group from the stroke data 70 acquired by the data acquisition section 130. The tag information group (hereinafter referred to as a "tag set 142") indicates the types of tags and the order of appearance of the tags. The types of the tags each indicate the semantic attribute of each of sets of strokes. The detailed functions of the tag generation section 132 are described later with reference to FIG. 14.

The content evaluation section 134 evaluates the content 62 (FIG. 4) in reference to the relation between the types of tags constituting the tag set 142 generated by the tag generation section 132 or the relation of the order of appearance of the tags. The evaluation target of the content evaluation section 134 may be a creation pattern related to the process of creating the content 62 or a step-by-step understanding of a solution to a problem.

An example of an evaluation index includes similarity between pieces of graph structure data of a plurality of the tag sets 142 (e.g., the graph distance based on the Graph edit distance method, the graph distance based on the Maximum common subgraph method, or Adamic/Adar similarity). In this case, not only the similarity of structures such as the number of nodes, the number and density of links, and the depth and width of the hierarchy, but also the similarity of tag information (the type, the order of appearance, etc.) associated with each node are taken into consideration. Specifically, the evaluation index is weighted in such a manner that the higher the rate at which the tag types match or are similar, the higher the similarity between pieces of the content 62, while the lower the rate at which the tag types match or are similar, the lower the similarity between the pieces of content 62. In addition, the evaluation index is weighted in such a manner that the closer the order of appearance of the tags that match or are similar in type, the higher the similarity between the pieces of content 62, while the farther the order of appearance of the tags that match or are similar in type, the lower the similarity between the pieces of content 62.

The creator classification section 136 classifies the creators of the pieces of content 62 into a plurality of groups according to the result of the evaluation by the content evaluation section 134. For example, when the content evaluation section 134 evaluates the creation patterns related to the process of creating the pieces of content 62, the creator classification section 136 classifies the creators of the pieces of content 62 into groups corresponding to the respective creation patterns. When the content evaluation section 134 evaluates the step-by-step understanding regarding a solution to a problem, the creator classification section 136 classifies the creators of the pieces of content 62 into groups corresponding to respective levels of understanding.

The output processing section 138 outputs information (i.e., evaluation result information 146) indicating the result of the evaluation performed by the content evaluation section 134 to an output or external device(s). This "output" includes the case where the information is output as visible or audible information to an output device (not illustrated) included in the server device 16 and the case where the information is transmitted to external device(s) such as the student terminals 12 or the teacher terminal 18 illustrated in FIG. 1.

The analysis information 52 includes a plurality of the tag sets 142, a reference tag set 144, and the evaluation result information 146. These pieces of information are described in detail later with reference to FIGS. 16 to 18.

Functional Block of Tag Generation Section 132

Figure 14:
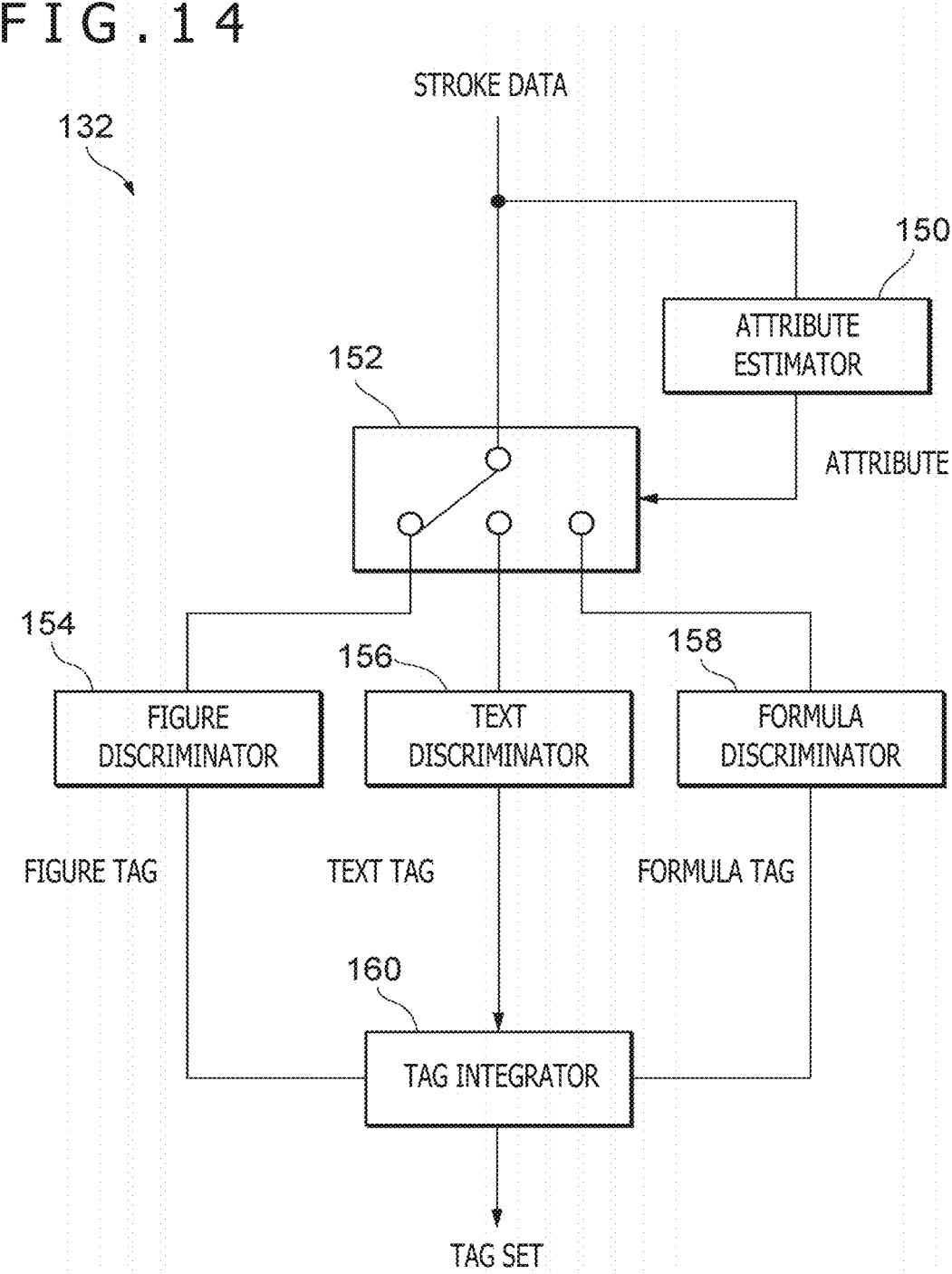
FIG. 14 is a functional block diagram of a tag generation section illustrated in FIG. 13.

FIG. 14 is a functional block diagram of the tag generation section 132 illustrated in FIG. 13. The tag generation section 132 includes an attribute estimator 150, a switch 152, a figure discriminator 154, a text discriminator 156, a formula discriminator 158, and a tag integrator 160.

The attribute estimator 150 is a learner that receives the stroke data indicating a collection of strokes as an input and outputs the semantic attribute of each of sets of the strokes. The attribute estimation is, for example, performed by the method disclosed in PCT Patent Publication No. WO2020/090356. The types of attributes include, for example, a figure, text, a formula, a chemical formula, and not-applicable.

The switch 152 includes one input terminal and three output terminals and switches the output destinations according to the attribute supplied from the attribute estimator 150. Specifically, when the attribute is "figure," the stroke data is supplied to an input side of the figure discriminator 154 via the switch 152. When the attribute is "text," the stroke data is supplied to an input side of the text discriminator 156 via the switch 152. When the attribute is "formula," the stroke data is supplied to an input side of the formula discriminator 158 via the switch 152.

The figure discriminator 154 is a learner that receives the stroke data as an input and outputs a figure tag. The figure tag indicates the identification information of a figure. Various artificial intelligence techniques including a hierarchical neural network and a convolutional neural network may be used to identify a figure. For example, the figure tag may be a figure element, such as a circle, a triangle, or a line segment, or may be an object, such as a dog, a cat, a tree, or a pencil.

The text discriminator 156 is a learner that receives the stroke data as an input and outputs a text tag. The text tag indicates identification information of text. Various artificial intelligence techniques including a hierarchical neural network and a convolutional neural network may be used to identify text. For example, the text tag may be a character, such as "A," "B," or "C," a word or a sentence including multiple characters, or a language, such as Japanese, English, or Chinese.

The formula discriminator 158 is a learner that receives the stroke data as an input and outputs a formula tag as an output. The formula tag indicates identification information of a formula. Various artificial intelligence techniques including a hierarchical neural network and a convolutional neural network may be used to identify a formula. For example, the formula tag may be a character, such as "X" or "Y," a number, such as "1," "2," or "3," an operator, such as "+" or "=," or a type of formula such as theorem, transformation, or final solution.

The tag integrator 160 sequentially integrates the "figure tag" from the figure discriminator 154, the "text tag" from the text discriminator 156, and the "formula tag" from the formula discriminator 158 and outputs them as the tag set 142 in association with the order of appearance of the tags. When there is some sort of relation between consecutive tags, they may be output as the graph structure data in which each tag is treated as a node.

The arithmetic rules of the tag generation section 132 may be uniform regardless of the students as the creators of the pieces of content 62 (FIG. 4) or may be customized for each student. In the latter case, it is desirable that a learning parameter group defining the arithmetic rule of the tag generation section 132 be stored in advance in association with the identification information with which a student can be identified, and be read out as appropriate with use of the identification information included in the digital ink Ink. For example, a learning support service user account, the electronic pen 14, or any of various IDs related to the student terminal 12 may be used as the identification information.

Description of Classification Operation

The classification operation of the server device 16 is next described with reference to a configuration diagram illustrated in FIG. 13, a flowchart illustrated in FIG. 15, and FIGS. 16 to 18.

Figure 15:
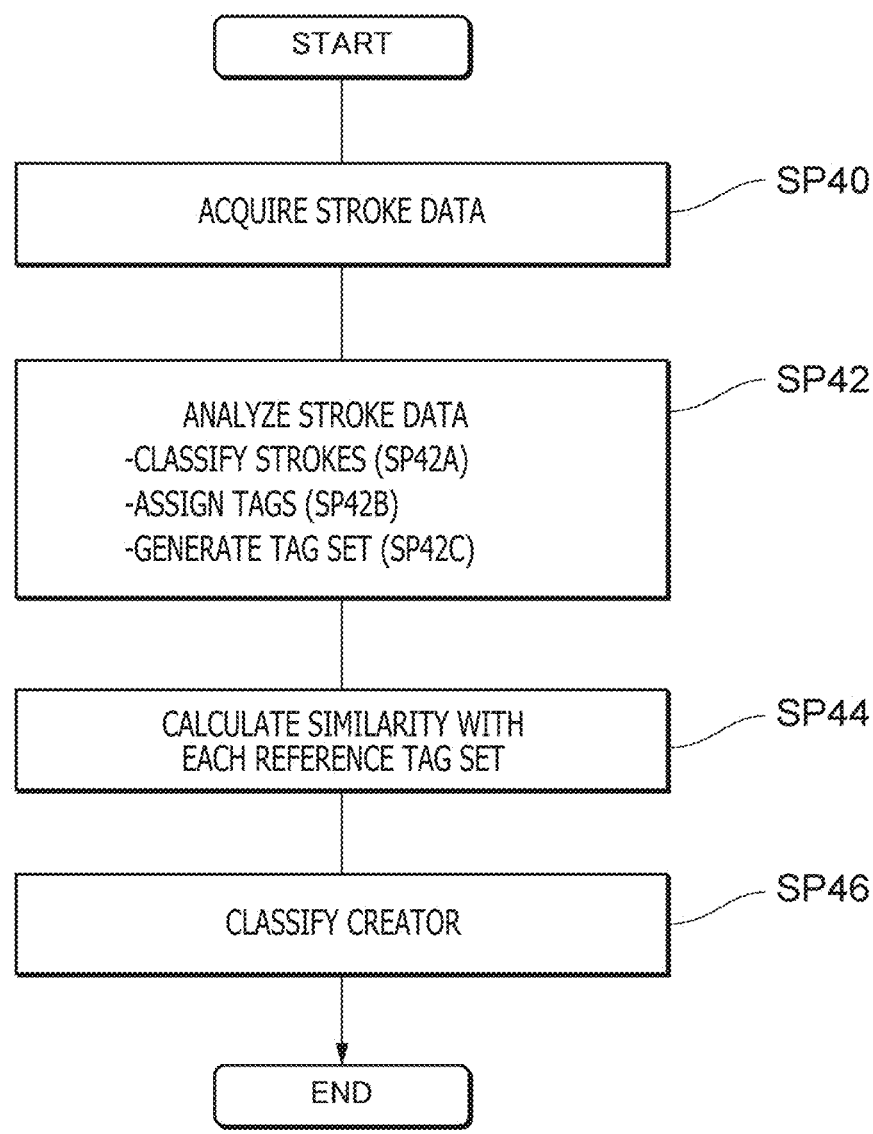
FIG. 15 is a flowchart illustrating a classification operation by the server device.

In step SP40 of FIG. 15, the data acquisition section 130 extracts the digital ink Ink to be evaluated, by referring to the ink DB 50 (FIG. 2), and acquires the stroke data 70 (FIG. 5) included in the digital ink Ink.

At the time when the digital ink Ink is generated, the document metadata, the device data, the stroke data, and the context data have already been determined, but the semantic data and the classification data have not yet been determined. In other words, at the time of execution of step SP40, classification of strokes and assignment of semantic attributes have not yet been performed on the digital ink Ink.

In step SP42, the tag generation section 132 performs an analysis process on the stroke data 70 acquired in step SP40. Specifically, classification of strokes by the attribute estimator 150 illustrated in FIG. 14 (step SP42A), assignment of tags by various discriminators (step SP42B), and integration of the tags by the tag integrator 160 (step SP42C) are sequentially performed. As a result, the tag set 142 corresponding to the content 62 is generated, and, if necessary, the tag set 142 is stored in predetermined locations (semantic data and classification data) of the digital ink Ink.

Figures 16, 17:
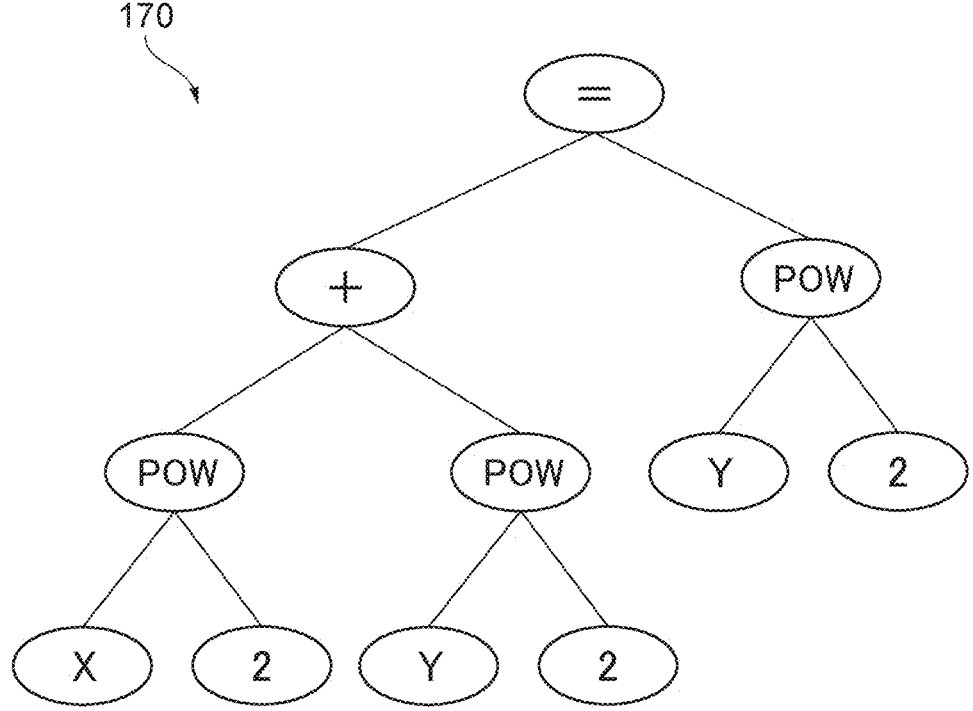
FIG. 16 is a diagram illustrating an example of a data structure of a tag set illustrated in FIG. 13.
FIG. 17 is a conceptual diagram of a graph structure indicated by graph structure data illustrated in FIG. 16.

FIG. 16 is a diagram illustrating an example of the data structure of the tag set 142 illustrated in FIG. 13. The tag set 142 is data in the table format that indicates the correspondence between the order of appearance of the tags, the tag information, and the graph structure data. The tag information includes the content of each tag (e.g., "X") and the type of each tag (e.g., "alphabet" as the formula tag). The reference tag set 144 (FIG. 13) also has a similar data structure as the tag set 142.

FIG. 17 is a conceptual diagram of a graph structure 170 indicated by the graph structure data of FIG. 16. Here, the graph structure 170 is a tree structure that branches out as the hierarchy gets deeper. This graph structure 170 indicates the formula for the Pythagorean theorem, that is, the content element 66 illustrated in FIG. 4.

In step SP44 of FIG. 15, the content evaluation section 134 evaluates the creation pattern regarding the process of creating the content 62, by using the tag set 142 generated in step SP42. Specifically, the content evaluation section 134 calculates the similarity of the graph structure 170 between the tag set 142 and the reference tag set 144.

In step SP46, the creator classification section 136 classifies the creator of the content 62 into one of the groups, each of which corresponds to one of the creation patterns, by using multiple similarities calculated in step SP44. After the series of analysis processes ends, the controller 32 (FIG. 2) generates the evaluation result information 146 indicating the result of the evaluation performed by the content evaluation section 134 and the result of classification performed by the creator classification section 136.

Figure 18:
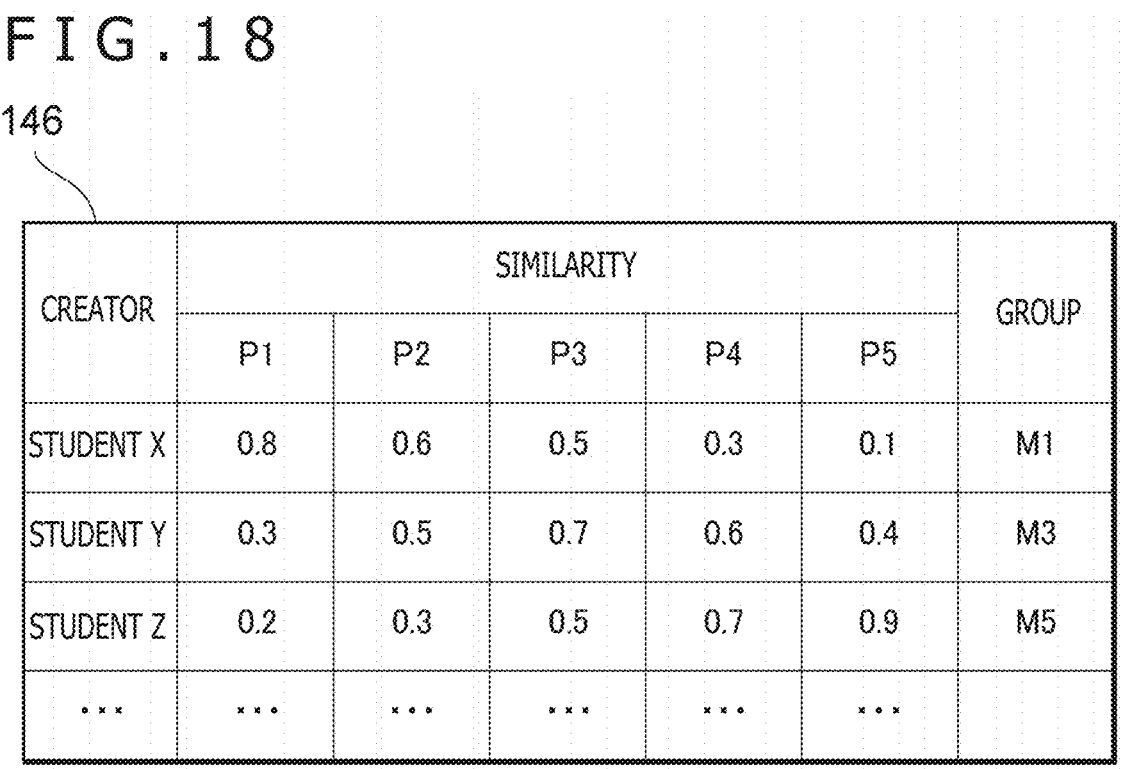
FIG. 18 is a diagram illustrating an example of a data structure of evaluation result information illustrated in FIG. 13.

FIG. 18 is a diagram illustrating an example of the data structure of the evaluation result information 146 illustrated in FIG. 13. The evaluation result information 146 is, for example, data in the table format indicating the correspondence between the "creator" of the answer, the "similarity" to each creation pattern, and the "group" into which the creator is classified. Here, the group names (in this example, groups M1 to M5) corresponding to the stages of the creation patterns (patterns P1 to P5) are assigned.

For example, assume that student Y has created the content 62 (that is, an answer) illustrated in FIG. 4. This answer is determined as "there is a description and the content thereof is correct" in the first and second steps of FIG. 6, but determined as "there is a description but the content thereof is incorrect" in the third step (the correct answer is z=5). In this case, the answer is evaluated as being closest to the creation pattern "P3" in FIG. 6. In other words, when the similarity in the answer of student Y is (P1/P2/P3/P4/P5)=(0.3/0.5/0.7/0.6/0.4), student Y is classified into group "M3" with the largest similarity.

In this way, in an arithmetic or math class, students with similar abilities, thinking patterns, and levels of understanding can be grouped together based on the content of their answers to a given problem. This enables efficient peer learning.

Advantageous Effects of Classification Operation

As described above, the classification processing unit 40 of the server device 16 includes the data acquisition section 130, the tag generation section 132, and the content evaluation section 134. The data acquisition section 130 acquires the stroke data 70 indicating the shapes of strokes constituting the handwritten content 62 and the drawing order of the strokes. The tag generation section 132 generates the tag set 142 indicating the types of tags each indicating a semantic attribute of each of sets of the strokes and the order of appearance of the tags by using the stroke data 70 acquired by the data acquisition section 130. The content evaluation section 134 evaluates the content 62 by using the tag set 142 generated by the tag generation section 132.

In this way, since the content 62 is evaluated using the tag set 142 indicating the types of tags each indicating a semantic attribute of each of sets of strokes and the order of appearance of the tags, a useful evaluation can be performed for various types of the content 62, taking into account the types of tags or the order of appearance of the tags.

The content evaluation section 134 may also evaluate the content 62 in reference to the relation of the types of tags constituting the tag set 142 generated by the tag generation section 132 and/or the relation of the order of appearance of the tags. Moreover, when the storage 34 stores the reference tag set 144 indicating the reference for the tag set 142, the content evaluation section 134 may evaluate the content 62 with use of the similarity between the graph structure of the tag set 142 generated by the tag generation section 132 and the graph structure of the reference tag set 144 stored in the storage 34.

Modifications

The present disclosure is not limited to the embodiments described above, and it is a matter of course that any changes can be made to the present disclosure without departing from the scope of the present disclosure. The configurations described in the embodiment may also freely be combined as long as no technical inconsistency arises. The order of execution of each step included in the flowchart may also be changed as long as no technical inconsistency arises.

In the example described in the embodiments above, the pieces of content 62, 82, and 90 are answers to arithmetic or math problems. However, the type of content is not limited thereto. For example, the content may be an answer or report to a science problem in general, such as problems in natural science, physics, or chemistry or may be a variety of work products including a note which summarizes the user's own thoughts. The data format of the content may be either a vector format or a raster format. The type of content is not limited to a handwritten image and may also be an electronic book or a video.

In the example described in the embodiments above, the reference tag set 144 illustrated in FIG. 13 is stored in advance. However, the location of the reference tag set 144 is not limited thereto. For example, the content evaluation section 134 may perform a clustering process on a plurality of the tag sets 142 to create the reference tag set 144 suitable for the population.

In the example described in the embodiments above, the content evaluation section 134 illustrated in FIG. 13 evaluates the content 62 by using the tag set 142. However, the input information used for evaluation is not limited thereto. For example, measurement values such as the creator's heart rate, pulse rate, body temperature, and grip pressure of the electronic pen 14 may be included in the input information to make it possible to also evaluate the physical and psychological state of the creator or changes in the state.

The invention claimed is:

1. An information sharing system comprising:
   a plurality of terminal devices; and
   an information sharing device which is communicable with each of the terminal devices,
   wherein each of the terminal devices includes:
      a display unit which displays content handwritten in a display region, and
      a processor which performs display control over the display unit, and
   wherein the information sharing device includes:
      a classification processing program which classifies a plurality of users of the terminal devices into groups in reference to a result of evaluation of pieces of stroke data each indicating the content handwritten by a user of a corresponding one of the terminal devices, and
      a display instruction program which instructs each of terminal devices corresponding to two or more constituent members belonging to one of the groups classified by the classification processing program among the terminal devices to display a status information area indicating states of the two or more constituent members,
   wherein the display instruction program transmits shared data including pieces of anonymous information of the two or more constituent members to the terminal devices corresponding to the two or more constituent members,
   wherein each of the terminal devices corresponding to the two or more constituent members displays the states of the two or more constituent members and the pieces of anonymous information in the status information area.

2. The information sharing system according to claim 1, wherein the status information area is a collection of individual information areas each indicating a state of a corresponding one of the constituent members, and
the processor performs the display control in such a manner that a display mode of each of the individual information areas is changeable for each constituent member.

3. The information sharing system according to claim 2, wherein the processor performs the display control in such a manner that at least one individual information area included in the status information area is highlighted more than a rest of the individual information areas.

4. The information sharing system according to claim 3, wherein the processor performs the display control in such a manner that the at least one individual information area is highlighted in response to an operation performed by the user.

5. The information sharing system according to claim 3, wherein the processor performs the display control in such a manner that the at least one individual information area is highlighted in response to an instruction from the information sharing device.

6. The information sharing system according to claim 1, wherein the status information area is a status information column or a status information row.

7. The information sharing system according to claim 1, wherein the processor of a first terminal device of the terminal devices performs the display control in such a manner as to display the status information area indicating a state of each of the two or more constituent members exclusive of the state of a user of the first terminal device.

8. The information sharing system according to claim 1, wherein the processor performs the display control in such a manner that the status information area is placed in a periphery of the display region.

9. The information sharing system according to claim 8, wherein the processor performs the display control in such a manner that the display region is split into two or more sub-regions and each of pieces of the content being displayed by the terminal devices corresponding to the constituent members is displayed in a corresponding one of the sub-regions to present a split-screen view.

10. The information sharing system according to claim 1, wherein the constituent members are students, and
each of the states of the constituent members includes an amount of study time spent by a corresponding one of the students.

11. The information sharing system according to claim 1, wherein the constituent members are students, and
each of the states of the constituent members includes a progress of a corresponding one of the students regarding an exercise problem.

12. The information sharing system according to claim 1, wherein the classification processing program includes
a data acquisition section which acquires stroke data indicating shapes of strokes constituting the content and a drawing order of the strokes,
a tag generation section which generates, from the stroke data acquired by the data acquisition section, a tag set indicating types of tags and an order of appearance of the tags, the types of the tags each indicating a semantic attribute of each of sets of the strokes, and
a content evaluation section which evaluates the content by using the tag set generated by the tag generation section.

13. The information sharing system according to claim 12,
wherein the information sharing device further includes a storage storing a reference tag set that indicates a reference for the tag set, and
the content evaluation section evaluates the content by using a similarity between a graph structure of the tag set generated by the tag generation section and a graph structure of the reference tag set stored in the storage.

14. An information sharing method performed by an information sharing system including a plurality of terminal devices each including a display unit which displays content handwritten, and an information sharing device which is communicable with each of the terminal devices, the information sharing method comprising:
classifying, by the information sharing device, a plurality of users of the terminal devices into groups in reference to a result of evaluation of pieces of stroke data each indicating the content handwritten by a user of a corresponding one of the terminal devices;
instructing, by the information sharing device, each of terminal devices corresponding to two or more constituent members belonging to one of the classified groups among the terminal devices to display a status information area indicating states of the two or more constituent members;
transmitting, by the information sharing device, shared data including pieces of anonymous information of the two or more constituent members to the terminal devices corresponding to the two or more constituent members; and
displaying, by each of the terminal devices corresponding to the two or more constitute members, the states of the two or more constituent members and the pieces of anonymous information in the status information area.

15. The information sharing method according to claim 14, wherein the status information area is a status information column or a status information row.

16. A non-transitory computer-readable medium encoded with an information sharing program for controlling operation of an information sharing system including a plurality of terminal devices each including a display unit which displays content handwritten, and an information sharing device which is communicable with each of the terminal devices, wherein the information sharing program is configured to cause the information sharing device to execute a process comprising:
classifying a plurality of users of the terminal devices into groups in reference to a result of evaluation of pieces of stroke data each indicating the content handwritten by a user of a corresponding one of the terminal devices;
instructing each of terminal devices corresponding to two or more constituent members belonging to one of the classified groups among the terminal devices to display a status information area indicating states of the two or more constituent members;
transmitting shared data including pieces of anonymous information of the two or more constituent members to the terminal devices corresponding to the two or more constituent members; and
displaying the states of the two or more constituent members and the pieces of anonymous information in the status information area of each of the terminal devices corresponding to the two or more constituent members.

17. The non-transitory computer-readable medium according to claim 16, wherein the status information area is a status information column or a status information row.

\* \* \* \* \*